(No Model.) 2 Sheets—Sheet 1.

E. C. BURNETTE & W. H. PORTER.
PORTABLE HAY PRESS.

No. 335,053. Patented Jan. 26, 1886.

WITNESSES

INVENTORS
Eliphaz C. Burnette
William H. Porter

Attorney (No Model.) 2 Sheets—Sheet 2.
E. C. BURNETTE & W. H. PORTER.
PORTABLE HAY PRESS.
No. 335,053. Patented Jan. 26, 1886.
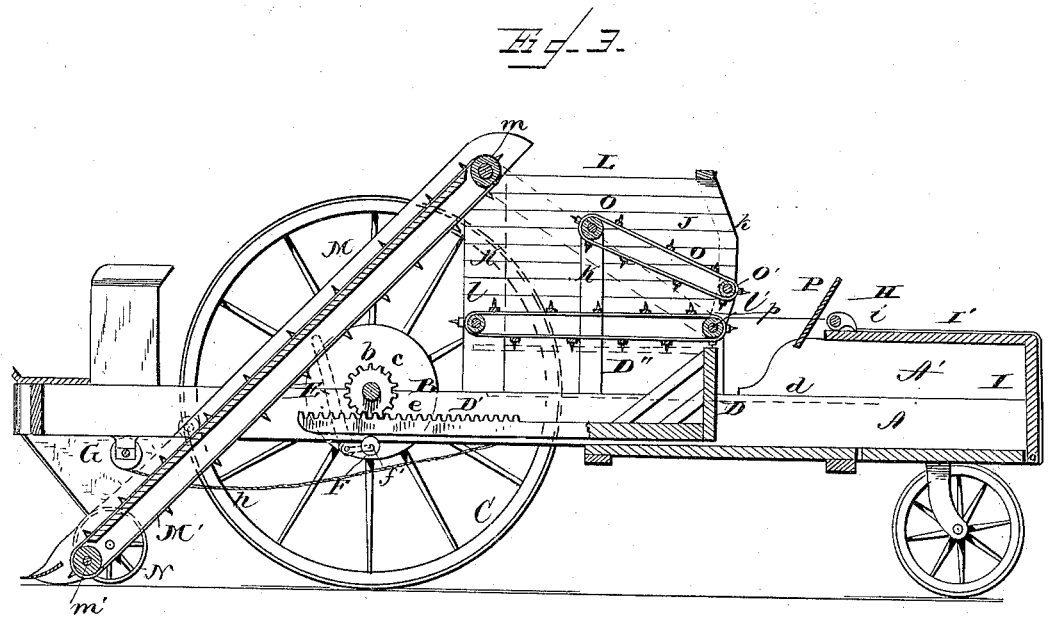
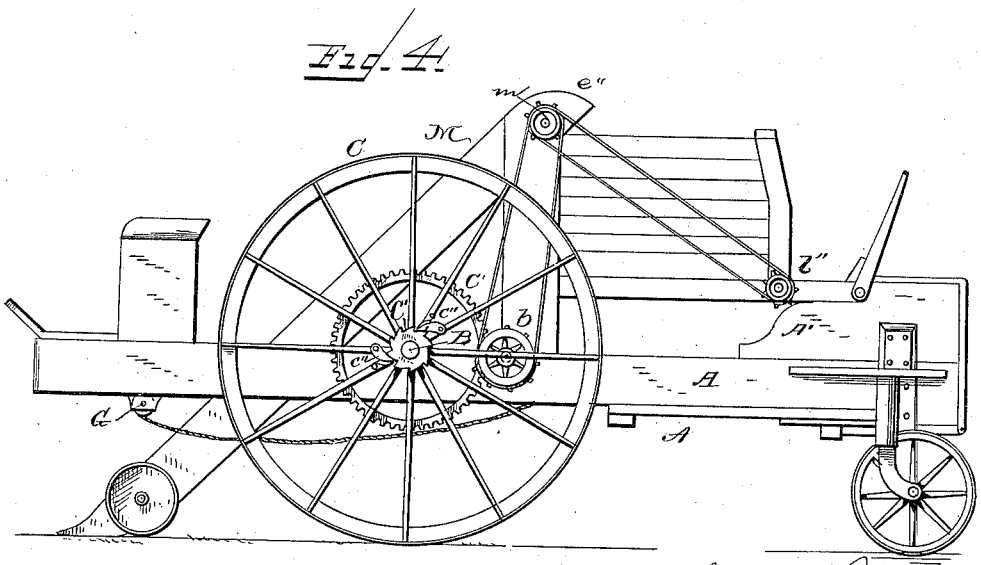
WITNESSES
INVENTORS
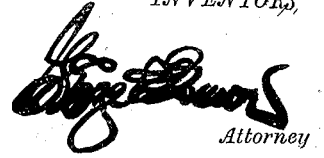
Attorney

UNITED STATES PATENT OFFICE.

ELIPHAZ C. BURNETTE AND WILLIAM H. PORTER, OF PARSONS, KANSAS.

PORTABLE HAY-PRESS.

SPECIFICATION forming part of Letters Patent No. 335,053, dated January 26, 1886.

Application filed December 17, 1885. Serial No. 185,953. (No model.)

*To all whom it may concern:*

Be it known that we, ELIPHAZ C. BURNETTE and WILLIAM H. PORTER, citizens of the United States of America, residing at Parsons, in the county of Labette and State of Kansas, have invented certain new and useful Improvements in Portable Hay-Presses; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention consists in certain new and useful improvements in combined hay-rakes and baling-presses, the object of our invention being to provide a means whereby hay or straw may be gathered, after being cut, and baled; and to this end our invention consists in mounting a hay-press upon wheels, and providing the same with a rake and means for conveying the hay to the baling-chamber, as will be hereinafter set forth.

Our invention also consists in the construction and combination of parts, as will be hereinafter fully set forth and claimed.

Figure 1:
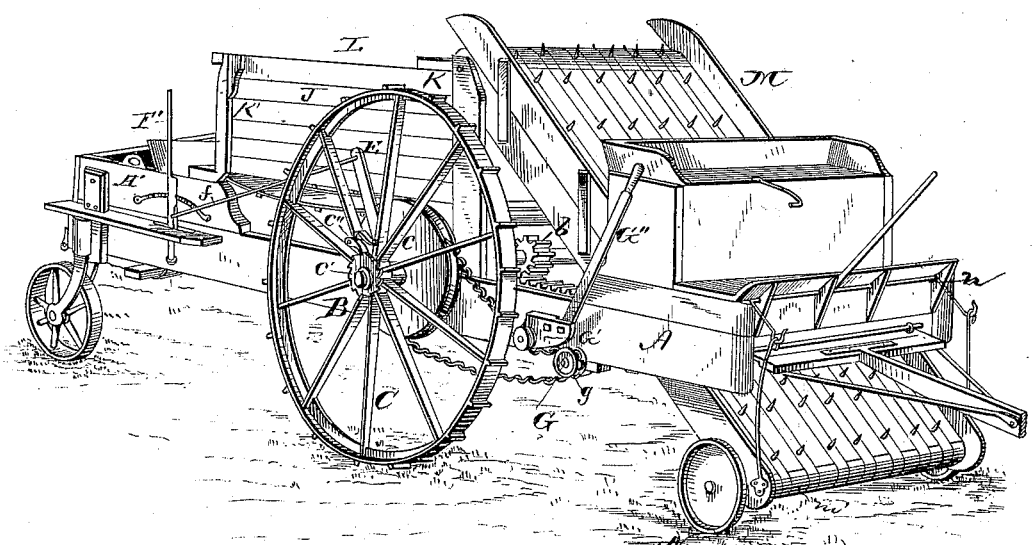
Figure 2:
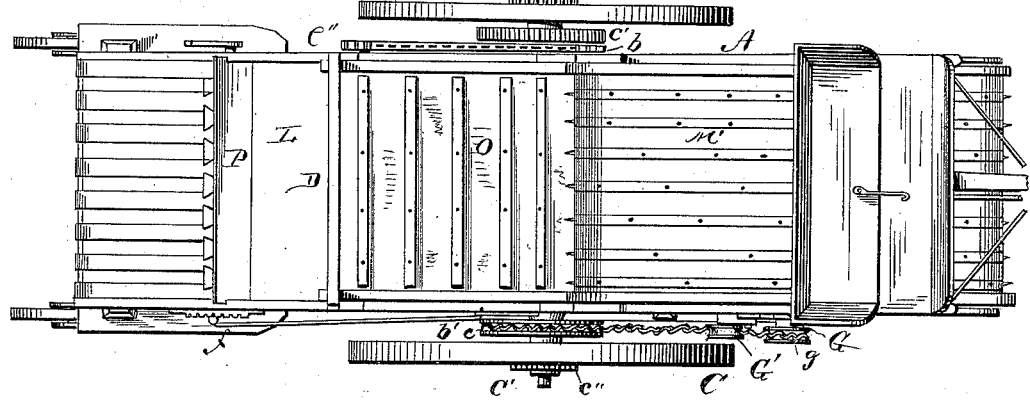

In the accompanying drawings, which illustrate our invention, Figure 1 is a perspective view of a combined baling-press and hay-rake constructed in accordance with our invention. Figure 2 is a plan view, and Fig. 3 is a longitudinal sectional view taken on the lines $x$ $x$ of Fig. 2, and Fig. 4 is a side view.

A A represent the side pieces of the frame, the rear ends of which are provided with upper side boards, A', which form the upper sides of the baling-chamber. These side pieces are rigidly connected to each other and to the side boards. The axle or main shaft B is journaled upon the upper edges of the side pieces, A A, and said axle is provided centrally with a gear-wheel, $b$, and upon the axle, adjacent to the outer edges of the side pieces, is located a pulley, $c$, and cog-wheel $c'$, both of which are rigidly attached to the axle or main shaft, so as to rotate therewith. The supporting-wheels C are loosely mounted on the main shaft, and are each provided with spring-pawls $c''$, which engage with ratchet-wheels C', which are attached to the outer ends of the shaft B, thus allowing the supporting-wheels to turn freely in one direction, while the movement in the opposite direction will cause the rotation of the shaft.

D represents the plunger of the baling-press, which moves longitudinally upon bars $d$, attached to the inner sides of the side pieces, A A, said plunger being provided with recesses, which fit over the bars $d$. This plunger has attached thereto a stem, D', which is provided on its upper edge with a rack-bar, $e$, the teeth of which are adapted to engage with the gear-wheel $b$, attached to the central portion of the shaft B. The plunger D is provided with a board, D'', which is of the same width as the plunger and extends forwardly in front of the same, for the purpose as will be hereinafter specified. A cross-bar, F, is pivotally attached to the under sides of the side pieces, A A, in front of the shaft B, and is provided centrally with a crank-arm, which carries an anti-friction roller, $f'$, which contacts with the under side of the rack-bar D', so as to elevate the same and bring it in contact with the cog-wheel $b$. The crank-bar F is at one of its ends provided with a lever, E, which is connected at its upper end by a rod, $f$, to a hand-lever, F', by means of which the rack-bar D' can be thrown in and out of gear with the pinion $b$. The rack-bar D, which is attached to the plunger, will rest normally upon the upper edge of the bar F or the anti-friction roller, so as to be out of engagement with the pinion on the central portion of the shaft, and when it is desired to place the rack-bar in engagement with said cog-wheel, it is only necessary to move forward the hand-lever F'.

To the under side of the side pieces, A A, near their front ends, is attached a roller-shaft, G, one of the outer ends of which is provided with a pulley, $g$, over which passes an endless belt or chain, which also passes over the pulley $c$, attached to the shaft B, this endless belt being slack upon these pulleys, so that normally the pulleys may rotate without carrying with them the belt or communicating motion from one pulley to the other; and to put these pulleys in gear I provide a belt-tightener, G', which is pivoted to one of the side pieces A, near the driver's seat, and the same is provided at one end with a roller, so that when this roller is depressed by the hand-lever G'' it will be forced upon the belt so as to take up the slack, and thus cause the pulleys $g$ and $c$ to be geared to each other, so that the shaft B will rotate the shaft G. The shaft G has attached thereto flexible connections or ropes $h$, which are secured to the same and to the plunger D, so as to draw said plunger toward the front of the apparatus when the pulleys $g$ and $c$ are geared to each other.

The upper portion of the side pieces, A' A, are connected to each other by a cross-bar, H, which has pivotally attached thereto a transverse rod with locking-cams $i$, one end of said rod being provided with a lever, so as to provide means for operating the locking-cams. This lever may engage with pins or other suitable devices attached to the side pieces, for holding the lever down and the cams in engagement with the hinged portion of the baling-box. The bottom of the baling-box, as well as the hinged portion I I', are made up of slats, thus providing spaces, through which the baling-wires may pass. The end and top sections, I I', have rigidly attached thereto braces and cross-bars, the end of the top section of the baling-box being provided with a transverse strip, with which engages the ends of the locking-cams.

Rear of the axle B, above the frame A A, is attached a superstructure, J, having vertical supports K K', as well as an end support, $k$, thus forming a receptacle, L, the bottom of which consists of an endless belt, which is mounted on rollers $l\ l'$. The shaft of the roller $l'$ extends beyond the frame-work and is provided with a sprocket-wheel, $l''$, through the medium of which said roller is rotated so as to turn the endless belt. The chain which drives this endless belt extends from a sprocket-wheel attached to the shaft $m$, and is driven therefrom.

M represents a suitable inclined frame, which is supported at its upper end by the shaft $m$, which passes through bearings attached to the vertical support K, and this frame inclines downwardly and passes through an opening between the side bars and frame, behind the driver-seat, and the side pieces thereof have journaled between their lower ends a roller, $m'$, over which roller passes an inclined belt, M', which is provided with an endless carrier having teeth.

The lower portion of the frame M is provided with wheels N, which are attached to the sides thereof, and the lower portions of the side bars are provided with shoes and rake-teeth, which will gather the hay or straw and deliver it upon the endless belt.

To the forward portion of the frame A is journaled a transverse bar, $n$, the ends of which are bent downwardly and attached to upwardly-projecting bars which are connected to the lower ends of the side beams of the frame M, and the center portion of the bar $n$ has a lever, which projects in front of the driver's seat, so that when said lever is drawn toward the driver's seat and made secure the pivoted frame M will be raised and held in a raised position. This lever may be secured to the driver's seat either by a hook, as shown, or other suitable fastening devices.

The shaft $m$, at one end, is provided with a doubled sprocket-wheel, over which passes chains, one of said chains extending to the sprocket-wheel on the shaft $l'$, while the other passes over a sprocket-wheel which has a pinion which engages with a gear-wheel, $c'$, attached to the shaft B.

O represents an inclined endless belt, which passes over rollers $o\ o'$, said rollers being mounted upon shafts journaled in the vertical supports K and $k$, and one of the outer ends of one of said shafts move a sprocket-wheel attached thereto, over which will pass the driving-chain, so as to cause the rotation of said belt.

P represents an inclined board, which is attached above the opening in the baling-box, so that the hay or straw, after it is deposited in the receptacle L, will be fed through the opening $p$, partially compressed, into the baling-box.

The operation of my invention is as follows: The plunger D is first brought to the position shown in Fig. 3, and allowed to drop, so as to rest upon the anti-friction roller $f'$, and be out of engagement with the pinion $b$. The lever supporting the frame M is then released, so as to allow the supporting-wheels N thereof to rest upon the ground, so that the rake attached thereto will gather the hay and feed it upon the endless belt. The belt-tightener G' is also released, so as to cause the chain which moves over the same to slacken, so that the roller G will remain stationary. Thus it will be noticed that the baling-press is placed out of connection with the drive-wheel. When the apparatus is moved forward, the hay will be gathered by the rake-teeth and placed upon the endless belt, which will carry it into the receptacle L, from which it is carried by the horizontal endless belt under the inclined endless belt O. It is then passed through the opening $p$, between said belts, into the baling-box in a slightly-compressed condition, the board P guiding the same into the opening which communicates with the baling-box. After a sufficient amount of hay has been deposited in the baling-box the lever E is moved forwardly, so as to bring the rack-bar D' into engagement with the cog-wheel, and the presser is then moved rearwardly, so as to press the hay within the baling-box, and after the wires have been tied around said bale and the same removed from the baling-box, the rack-bar is thrown out of engagement, and the plunger moved forward by the flexible connections $h$, which pass over the roller G.

If desirable, a cut-off, which consists of a board, may be placed in the receptacle to keep the hay from coming in contact with the horizontal and inclined endless belts therein while the hay is being compressed in the baling-press. It will noticed that the apparatus performs the operation of gathering and baling the hay while it is being moved across the field.

When the plunger is beyond the opening of the upper portion of the baling-box, said opening will be closed by the board D", attached thereto, and the hay may be allowed to accumulate upon said board, between the rear ends of the endless roller and in front of the board P, and the hay thus collected will immediately enter the baling-box when the plunger is withdrawn.

Having thus described our invention, we do not desire to confine ourselves to the precise construction shown, but reserve the right to change or modify the construction of our invention within the scope of our claims.

We claim—

1. A combined hay-gatherer and baling-press, substantially as shown and set forth.

2. An apparatus for gathering and baling hay, consisting of an upper frame mounted on wheels and provided with baling mechanism, an endless carrier pivoted to the same and provided with means for gathering and conveying hay to the baling-box, substantially as shown, and for the purpose set forth.

3. In a device for gathering and baling hay, a frame provided with a plunger adapted to be operated from a shaft which carries the supporting-wheels, a rake and endless carrier attached to the frame, said carrier being operated from the same shaft as the plunger of the press, substantially as shown, and for the purpose set forth.

4. In a combined hay-gatherer and baling-press, a frame mounted on wheels and provided with a baling-box, reciprocating plunger, and means for moving said plunger in either direction, a frame carrying rake-teeth and an endless belt, which is driven from the shaft of the supporting-wheels, so as to carry the hay into the baling-box, substantially as shown, and for the purpose set forth.

5. In combination with a frame constructed substantially as shown and described, and provided with a transverse shaft, upon which are mounted the supporting-wheels, a plunger adapted to reciprocate within the rear portion of said frame, and provided with a rack-bar for engagement with a pinion on the main shaft and a lever for throwing said rack-bar in and out of engagement substantially as shown, and for the purpose set forth.

6. In a portable baling-press, a frame mounted on wheels and constructed substantially as shown, a reciprocating plunger provided with a rack-bar, which engages with a cog-wheel or pinion attached to the shaft which carries the supporting-wheels, a lever for throwing said rack-bar in and out of engagement, flexible connections attached to the plunger and to a roller provided with a connection for operating the same from the main shaft, and means for throwing said connection in and out of engagement with the main shaft, the parts being organized substantially as shown, and for the purpose set forth.

7. In combination with a press constructed substantially as described, and provided with a reciprocating plunger with a forwardly-extending portion, D", an endless carrying-belt and a belt for carrying the hay from a receptacle to the baling-box, substantially as shown, and for the purpose set forth.

In testimony whereof we affix our signatures in presence of two witnesses.

ELIPHAZ C. BURNETTE.
WILLIAM H. PORTER.

Witnesses:
E. C. READ,
HENRY L. S. KNIFFIN.